June 5, 1962  E. C. CREUTZ  3,037,924
JACKETED BODY

Filed July 30, 1945  3 Sheets-Sheet 1

Witnesses:
Herbert E. Metcalf
John B. Willard

Inventor:
Edward C. Creutz
By Robert A. Lavender
Attorney

June 5, 1962 — E. C. CREUTZ — 3,037,924
JACKETED BODY
Filed July 30, 1945 — 3 Sheets-Sheet 2

Witnesses:
Hubert E. Metcalf
John B. Willard

Inventor:
Edward C. Creutz
By Robert A. Saunders
Attorney

June 5, 1962  E. C. CREUTZ  3,037,924
JACKETED BODY

Filed July 30, 1945  3 Sheets-Sheet 3

Witnesses:
Herbert C. Metcalf
John B. Willard

Inventor:
Edward C. Creutz
By Robert A. Lavender
Attorney

United States Patent Office 3,037,924
Patented June 5, 1962

3,037,924
JACKETED BODY
Edward C. Creutz, Santa Fe, N. Mex., assignor to the United States of America as represented by the United States Atomic Energy Commission
Filed July 30, 1945, Ser. No. 607,881
6 Claims. (Cl. 204—193.2)

This invention relates to neutronic reactors and to a novel article of manufacture used in and in combination with such reactors. In neutronic reactors of any type a neutron fissionable isotope such as $U^{233}$, $U^{235}$, or $94^{239}$ or mixtures thereof is subjected to fission by absorption of neutrons and a self-sustaining chain reaction is established by the neutrons evolved by the fission. As an example, such reactors may comprise bodies of compositions containing such fissionable material, for example, natural uranium, disposed in a neutron slowing material which slows the neutrons to thermal energies. Such a slowing material is termed a neutron moderator. Carbon, beryllium, and $D_2O$ are typical moderators suitable for such use. Heat is evolved during the reaction which is removed by passage of a coolant through the reactor or in heat exchange relationship therewith. Specific details of the theory and essential characteristics of such slow neutron reactors are set forth in copending application of Enrico Fermi, Serial No. 568,904, filed December 19, 1944 and granted as U.S. Patent No. 2,708,656 on May 17, 1955.

In the operation of neutronic reactors at a substantial power, for example, 1000 kilowatts or more, for more than a few minutes difficulty has been encountered due to the fact that the moderator and/or coolant became radioactive during the operation of the reactor. This seriously complicates operation of the reactor since the radioactivity of the coolant and moderator may constitute a serious hazard to personnel.

Improved neutronic reactors have been produced wherein the tendency of the moderator and/or coolant to become radioactive is substantially minimized. It has been found that this result may be secured by interposing a solid non-fissioning barrier between the fissioning isotope and the coolant or moderator or both. Notwithstanding the fact that introduction of non-fissioning isotopes into a neutronic reactor absorbs neutrons and therefore may tend to prevent establishment of a neutron chain reaction, it has been discovered that it is possible to insert non-fissioning barriers into the reactor, and to so proportion the thickness of the barrier to prevent passage of all or a preponderant amount of fission fragments from the fissioning isotope into the moderator and/or coolant while yet avoiding use of such a quantity of barrier that the neutron absorption thereof prevents establishment or maintenance of the neutron chain reaction. The barrier itself should be constructed of a material or materials having a low neutron capture cross section. Metallic aluminum and beryllium are particularly good materials for this purpose.

While the barrier may be interposed in various ways, a particularly advantageous structure involves the use of a non-fissioning enclosure about the fissioning isotope. An especially effective neutronic reactor may be constructed by providing a neutron moderator with spaced rods, tubes, or other convenient form of solid fissionable material enclosed in a non-fissioning enclosure and extending into or through the moderator.

In order to promote heat transfer from the fissioning isotope through the barrier to the contacting moderator and/or coolant, the barrier should be in close intimate contact with the fissioning composition. Generally, special precautions are observed for this purpose. Thus, a shell forming the non-fissioning barrier may be shrunk upon the fissioning component which preferably is in the metallic state. These enclosed fissionable components are used as the active component of a neutronic reactor, and frequently are located in contact with a coolant such as a gas or liquid coolant for removal of heat from the enclosed fissionable components and from the reactor. Where the coolant has a corrosive effect upon the fissionable metal or other material, the non-fissioning sheath also serves to protect the fissionable material. In such a case, every precaution must be taken to prevent the existence of pores in the sheath through which the coolant may enter. Frequently sheaths are hermetically sealed about the fissionable material in order to seal the material from the coolant. In a particularly advantageous reactor embodiment the enclosed fissionable bodies are disposed within channels in the moderator through which the coolant is permitted to flow. This coolant may flow externally or internally or externally and internally of the fissionable component.

Not infrequently, difficulty may be encountered in securing a satisfactory transfer of heat through the non-fissioning barrier or sheath. This is particularly true after prolonged operation of the reactor at various temperatures. In such a case the sheath may tend to shrink from the uranium or other fissioning component thereby reducing the coefficient of heat transfer therebetween. This difficulty may be substantially avoided by bonding the aluminum or similar sheath to the uranium by means of a suitable bonding agent. This bonding agent should be sufficiently ductile to withstand a tendency to crack or rupture due to thermal expansion of the uranium or other composition, and also should have a low neutron absorption cross section. Zinc, aluminum-silicon and bismuth alloys have been found to be suitable where the operating temperature is not unduly high. The bonding layer not only serves to improve transfer of heat but also provides an additional protection against corrosion of the uranium or similar fissioning element by the coolant or moderator.

As previously noted, lengths or segments of the fissionable bodies generally are disposed end to end in channels extending through or at least into the moderator. During the chain reaction the central interior portion of these bodies frequently rises to a temperature much above the temperature of the body exterior which is in close relationship with the coolant. This condition may lead to serious difficulty in a system where a plurality of fissionable bodies are laid end to end through the channels in the moderator and where coolant, particularly a liquid coolant such as water, is passed in contact with the fissionable bodies or sheathed fissionable bodies. In such a case the ends of each length may be at a temperature substantially higher than the temperature of the sides thereof, and thus the coolant contacting the ends may become seriously overheated and caused to boil. Such boiling would produce an exceedingly hazardous condition in an operating neutronic reactor. Moreover local over-heating tends to melt the solder, the bonding material or the jacket or other covering thereby destroying the effectiveness of the barrier in confining the fission products and in separating the fissionable material from contact with the reactive coolant. Furthermore, diffusion of the uranium or other fissionable material into the aluminum jacket or barrier may occur at high temperature and the uranium contaminated aluminum becomes susceptible to destructive reaction by the coolant with consequent destruction of the barrier property.

In accordance with this invention, this difficulty may be avoided or at least partially eliminated by interposing heat insulation between the segments of fissionable material in order to prevent the temperature of the ends of the segments from reaching an excessive value.

When such heat insulating means are provided adjacent the ends of the lengths, transfer of heat directly from the ends of the body segments to the sheath or barrier overlying such ends is substantially reduced and the evolved heat is transferred through the uranium from its axis outwardly to its circumference. An especially effective modification of the invention comprises a neutron moderator with channels therein; coolant passing through the channels; and fissionable bodies in the form of elongated fissionable bodies laid end to end in the channels, said bodies being enclosed by a non-fissioning barrier with heat conducting and heat insulating means between adjoining segments.

Accomplishment of the foregoing constitutes some of the principal objects and advantages of the invention, others of which will become apparent from the following description and drawings in which.

Figure 1:
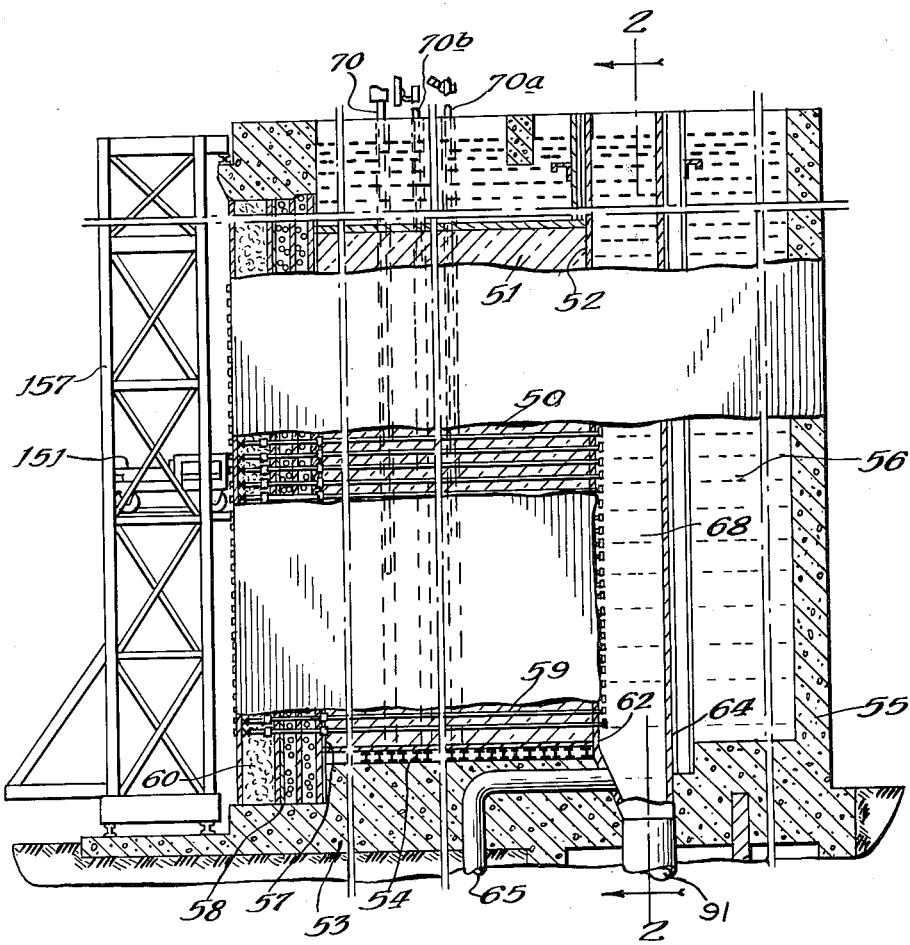
FIG. 1 is a diagrammatic longitudinal sectional view partly in elevation of a liquid cooled neutronic reactor.

In order that a self-sustaining neutronic chain reaction can be established and maintained, the losses of neutrons must be held to a value so low that at least one neutron is available for a new fission, after losses have been deducted, per neutron consumed in production of fission. In fission of $U^{235}$ and similar isotopes, more neutrons are evolved per fission than are required to produce the fission. For example, about 2.3 neutrons are evolved per neutron consumed in fission of $U^{235}$, and about 2.8 neutrons are evolved per neutron consumed in fission of $94^{239}$. These evolved neutrons are used up in fission of further $U^{235}$ or $94^{239}$ atoms or are lost. If losses do not reduce the ratio of neutrons evolved to neutrons consumed or lost below one, the chain reaction will continue.

Losses may be external, as when neutrons escape from the reactor, or internal. Internal losses are caused by absorption of neutrons by atoms which do not fission when the neutron has been absorbed.

$U^{238}$ present in natural uranium absorbs substantial quantities of neutrons to produce $94^{239}$ as previously discussed. This loss may be substantially reduced by use of uranium aggregates. Thus, it has been found that $U^{238}$ absorbs neutrons to an appreciable degree at energies (resonance energies) greater than thermal energies due to its relatively high capture cross-section with respect to that of $U^{235}$ at such resonance energies. However, this type of absorption, known as resonance absorption, may be reduced by decreasing the amount of neutrons which pass into a uranium body until these neutrons have been slowed to thermal energy. This may be done by reducing the ratio of surface area per unit weight of uranium, i.e., by using natural uranium in the form of aggregates preferably having a minimum thickness of about 0.5 centimeter.

Neutron moderators also absorb neutrons. Generally speaking, it is desirable to use as a moderator an element (or compound thereof) of low atomic weight and low neutron capture cross-section. The ability to slow down neutrons may be expressed by the slowing down power, which in turn is defined by the scattering cross-section divided by the atomic weight, whereas the ability to absorb the capture neutrons may be expressed as the capture cross-section. The ratio of absorption cross-section to scattering cross-section of various materials are approximately as follows:

| | |
|---|---|
| Light water ($H_2O$) | 0.00478 |
| Diphenyl | 0.00453 |
| Beryllium | 0.00127 |
| Graphite | 0.000726 |
| Heavy water ($D_2O$) | 0.000017 |

For natural uranium it is perferred to use materials wherein the above ratio is below about 0.004. However, with enriched uranium compositions containing more than natural amounts of $U^{235}$, a greater latitude is permissible. Using carbon or deuterium oxide as moderators and natural uranium as the fissionable composition, only about 1.1 or 1.3 neutrons, respectively, are obtained per neutron consumed due to neutron losses in the $U^{238}$ and the moderator. Since the external neutron losses may be substantial, other internal neutron losses should be held sufficiently low to prevent these losses from rising so high as to prevent the reaction.

Other components of the reactor including the coolant, impurities in the uranium, moderator, control or limiting rods, fission fragment, restraining barrier, etc., absorb neutrons in varying amounts depending upon their neutron capture cross section.

The effect of these impurities or absorbers in a reactor containing natural uranium as the fissionable component has been approximately evaluated for each element as a danger coefficient. This coefficient is computed according to the formula $$\frac{\sigma_i}{\sigma_u} \cdot \frac{A_u}{A_i}$$

where $\sigma_i$ represents the cross section for absorption of thermal neutrons of the impurity;

$\sigma_u$ represents the cross section for absorption of thermal neutrons of the uranium;

$A_i$ represents the atomic weight of the impurity or neutron absorber; and $A_u$ represents the atomic weight of uranium.

The following table gives presently known values for various elements having their natural isotopic content.

| Element | Danger Coefficient | Element | Danger Coefficient |
|---|---|---|---|
| $H^1$ | 10 | Mo | 1.0 |
| $D^2$ | 0.01 | Ru | ~2 |
| He | 0 | Rh | 50 |
| Li | 310 | Pd | ~2 |
| Be | 0.04 | Ag | 18 |
| B | 2,150 | Cd | 870 |
| C | 0.012 | In | 54.2 |
| N | 4.0 | Sn | 0.18 |
| O | 0.002 | Sb | 1.6 |
| F | 0.02 | Te | 1 |
| Ne | <3 | I | 1.6 |
| Na | 0.65 | Xe | <6 |
| Mg | 0.48 | Cs | 8.7 |
| Al | 0.30 | Ba | 0.30 |
| Si | 0.26 | La | <2.4 |
| P | 0.3 | Ce | <2.4 |
| S | 0.46 | Pr | <2.4 |
| Cl | 31 | Nd | ~17 |
| A | ~0.8 | Sm | ~1,430 |
| K | 2.1 | Eu | 435 |
| Ca | 0.37 | Gd | ~6,320 |
| Sc | <7 | Tb | ~20 |
| Ti | 3.8 | Dy | ~200 |
| V | 4 | Ho | ~10 |
| Cr | 2 | Er | ~40 |
| Mn | 7.5 | Tm | ~20 |
| Fe | 1.5 | Yb | ~10 |
| Co | 17 | Lu | ~30 |
| Ni | 3 | Hf | ~20 |
| Cu | 1.8 | Ta | 4.6 |
| Zn | 0.61 | W | 2.7 |
| Ga | ~1 | Re | ~18 |
| Ge | (<5) | Os | <1.7 |
| As | 2 | Ir | ~70 |
| Se | 6.3 | Pt | ~2.5 |
| Br | 2.5 | Au | 16 |
| Kr | <6 | Hg | 82 |
| Rb | ~0.4 | Tl | 0.5 |
| Sr | 0.57 | Pb | 0.03 |
| Y | 0.4 | Bi | 0.0025 |
| Zr | ~0.13 | Th | 1.1 |
| Cb | <0.4 | | |

From the above it will be apparent that certain elements would not be suitable as barriers in usual neutronic reactors. For example, cadmium, boron and gadolinium absorb neutrons to such an extent that they could not be used. On the other hand, aluminum and beryllium are typical of the elements which could be used although the amount thereof must be limited. For example, if a neutronic reactor is capable of supplying 1.06 neutrons per neutron consumed in fission when all losses exclusive of that caused by the sheath have been taken into account, then the loss due to the sheath can in no case exceed 0.06/0.30 part by weight per part of uranium or 20 percent of the weight of the uranium. These principles generally apply to other metals or materials for sheathing. Obviously where the sheath serves as a means for protection of the uranium, the resistance of the metal to corrosion and coolant impermeability must also be considered in selection of the sheath material.

From the above it will be apparent that for a neutron chain reaction to remain self-sustaining the equation $$n-x-y-z-l \geqq 1$$

where $n=$number of neutrons evolved by a fission of a fissionable isotope per neutron consumed by such isotope.

$x=$number of neutrons absorbed by a non-fissioning isotope such as $U^{238}$ in formation of a fissionable isotope per neutron consumed in fission during operation.

$y=$number of neutrons absorbed by the moderator per neutron consumed in fission during operation.

$z=$number of neutrons absorbed by other neutron absorbers per neutrons consumed in fission during operation.

$l=$number of neutrons lost by leakage per neutron consumed in fission.

Thus, with $U^{235}$ the sum of $x+y+z+l$ cannot exceed about 1.3 and with $94^{239}$ cannot exceed about 1.8.

The ratio of the fast neutrons produced in one generation by the fissions to the original number of fast neutrons in a theoretical system of infinite size from which there can be no loss by leakage is called the reproduction factor and is denoted by the symbol $k$. The $k$ constant of a system of finite size is the reproduction factor which the system would have if expanded to infinite size and is therefore a dimensionless constant. Usually this constant is expressed without regard to localized neutron absorbers such as control or limiting rods, which are not uniformly dispersed throughout the entire system. The neutron reproduction ratio ($r$) is an actual value for a finite system, and differs from $k$ by a factor due to loss of neutrons through leakage and through absorption by localized neutron absorbers. To maintain a chain reaction, $r$ must be at least equal to one. As pointed out in the above-mentioned Fermi application, it is preferably maintained below about 1.01 during operation of the reactor.

Computation of $k$ for any system may be determined experimentally in accordance with methods described in copending application of E. Fermi, Serial No. 534,129, filed May 4, 1944, entitled "Nuclear Chain Reacting System," and granted as U.S. Patent No. 2,780,595 on February 5, 1957.

The reproduction ratio ($r$) may be ascertained by observation of the rate of increase of neutron density. It may also be predicted by computation of losses due to local absorbers or leakage which may be deducted from $k$ to secure this value. In such a case allowance for leakage is made depending upon the size of the reactors. For reactors of practical size, leakage usually amounts to about 0.01 to 0.3 $k$ units depending upon the amount by which the $k$ of the system exceeds one. Loss due to other absorbers may be computed by computation of the danger sum as heretofore described.

Figure 2:
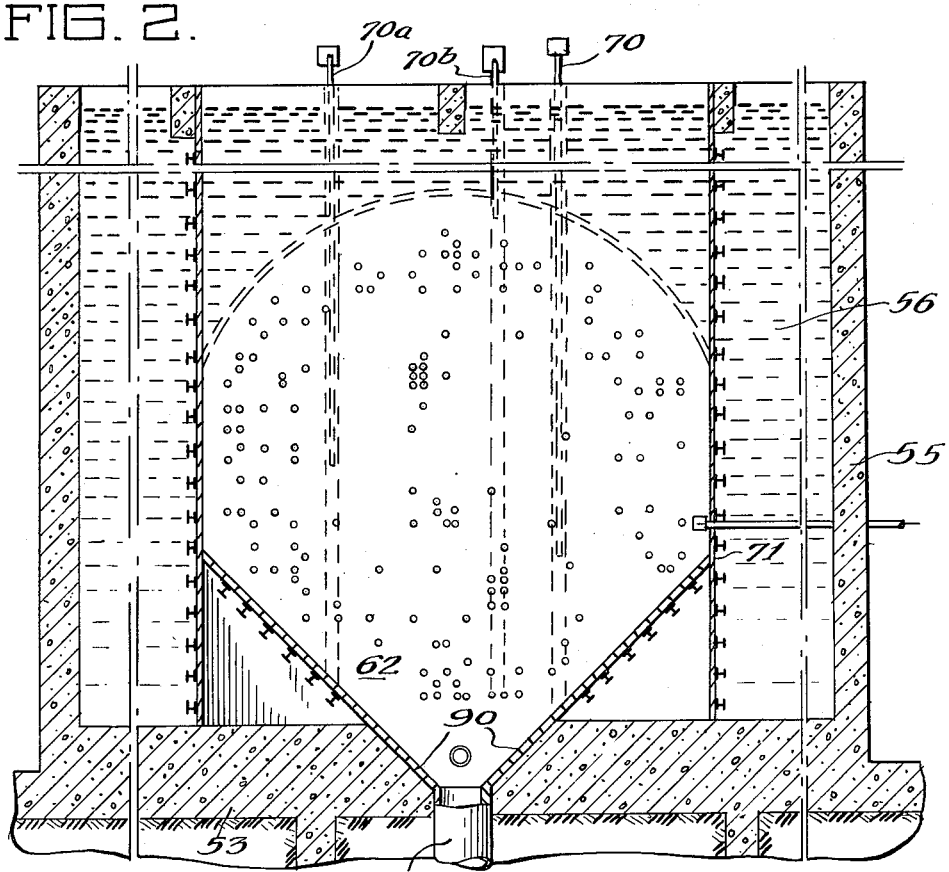
FIG. 2 is a vertical sectional view diagrammatically illustrating the reactor of FIG. 1 taken as indicated by the line 2—2.

The reactor shown in FIGS. 1 and 2 comprise a more or less cylindrical structure 50 built of graphite blocks of high purity generally containing less than 0.02$k$ units in impurities. The reactor is surrounded with a graphite reflector 51 forming an extension of the moderator and is enclosed by a fluid tight steel casing 52, supported on I beams 54 within a concrete tank 55, erected on foundation 53. Tank 55 is preferably filled with water or other neutron absorber 56 to act as a shield for neutrons and gamma radiation.

The encased reactor is surrounded on all sides except one by the water 56, and the side not surrounded, which is to be the charging face 57 of the reactor is provided with a shield tank 58 filled, for example, with lead shot and water.

A backing wall 64 is placed in tank 55 spaced from outlet face 62 and forming tank 68 which may or may not be filled with water. Aluminum or similar metal coolant tubes 59 extend through the adjacent concrete wall 60, through shield tank 58, through the graphite moderator block 50 to an outlet face 62 of casing 52 to empty into tank 58. Only a few tubes 59 are shown in FIG. 1 for sake of clarity of illustration.

On the outside of tank 55 where the coolant tubes enter the reactor, the ends of coolant tubes 59 are removably capped, and are supplied with coolant under pressure from conveniently positioned manifolds (not shown). Thus water can be passed through tubes 59 to be discharged adjacent to outlet face 62 into tank 68. Water, after having passed through the reactor is removed through outlet pipe 65.

The coolant tubes 59 may be charged with aluminum jacketed uranium bodies, hereinafter described, by uncapping the tube to be loaded and pushing the fissionable bodies into the tubes in end to end relationship. The reactor can then be loaded with sufficient uranium to make the reactor operative to establish high neutron densities, the heat being dissipated by the coolant circulation. This coolant may be water, for example, from a source such as a river, passed once through the reactor, and then discarded, or, the water may be cooled and recirculated in a closed system. Diphenyl and other similar coolants may be used in lieu of water.

The principal dimensions of the reactor are as follows:

| | |
|---|---|
| Axial length of active cylinder of reactor | 7 meters. |
| Radius of active cylinder of reactor | 4.94 meters. |
| Total weight of uranium metal in rods | 200 metric tons. |
| Weight of graphite in reactor | 850 metric tons. |
| Radius of uranium metal rods | 1.7 centimeters. |
| Thickness of aluminum jackets | 0.1 millimeter. |
| Thickness of aluminum pipe | 1.5 millimeters. |
| Thickness of liquid layer | 2.2 millimeters with water or 4 millimeters of diphenyl. |
| Number of rod channels in reactor | 1695. |
| Weight of aluminum in reactor | 8.7 metric tons. |
| Rod spacing in square array | 21.3 centimeters. |

The reactor is loaded from behind the shield from a loading car 151 mounted on travelling elevator 157. The car is aligned with the tube to be loaded and jacketed uranium segments pushed through the tube until the tube has been filled. Details of such loading operations are described in an application of Gale Young, Serial No. 552,730, filed September 5, 1944, granted as U.S. Patent No. 2,774,730 on December 18, 1956, and form no part of the present invention.

The neutron density in the reactor is controlled by means of cadmium or boron clad aluminum rods or tubes which may be moved into or out of channels in accordance with the desired neutron density, and are diagrammatically illustrated at 70. Limiting or "Shim" rods 70a are also provided and generally are locked in place in order to prevent the neutron reproduction ratio from exceeding a safe value of about 1.01. Moreover, removable safety rods 70b are also provided to shut the reactor down by insertion of the rods therein in case of emergency. Both shim and safety rods are constructed similar to the control rods.

Tank 68 is provided with a bottom 90 which slopes toward the center leading to an outlet 91 for eventual discharge of the enclosed fissionable bodies.

Figure 3:
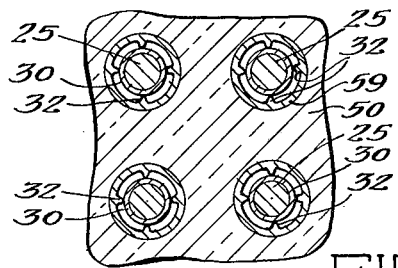
FIG. 3 is a fragmentary cross-sectional view through the reactor illustrating the relationship of the channels in the reactor of FIG. 1.

The location of the fissionable bodies in the tubes is diagrammatically illustrated in FIG. 3. A protective coating 30 of aluminum completely covers the surface of the uranium rods 25, each rod being surrounded by an aluminum tube 59 of a diameter sufficient to permit passage of coolant over the rod. The tubes 59 are provided with internally extending longitudinal ribs 32 for centering the rods 25 in the tubes 59.

Inasmuch as the protecting coatings have the property of absorbing neutrons to some extent, it is desirable to maintain the quantity of the aluminum or other sheath within the pile at a minimum, in order to make possible a chain reaction therein as previously discussed. Consequently, the thickness of the aluminum tubes and jackets should be maintained at the minimum required from the standpoint of strength, possible corrosion and erosion, and ability to restrain fission products to a substantial degree. Where the jacketed bodies are exposed directly to the attack of a corrosive coolant such as water, the jacket should be hermetically sealed in order to prevent leakage. Hermetically sealing the uranium rods or tubes in very thin jackets of material having small resistance to neutron passage poses a problem rather difficult of solution. The thickness of the jackets for the uranium tubes generally is of the order of 0.005 to 0.035 inch.

For convenience in handling the uranium rods or tubes, they are made in relatively short lengths, for instance, about 8 inches in length. Several methods may be employed for assembling and hermetically sealing a uranium body in a thin jacket of aluminum, stainless steel or similar material.

Figure 4:
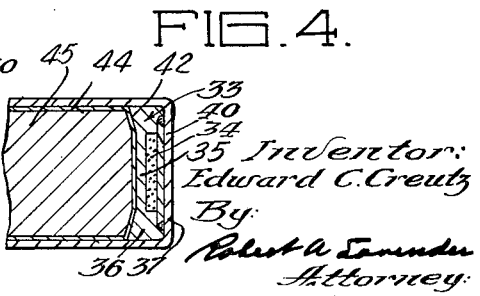
FIG. 4 is a longitudinal sectional view of a fissionable body enclosed in a sheath of non-fissionable material wherein the sheath is bonded to the fissionable body.

Referring more particularly to FIG. 4, there is illustrated one embodiment of a jacketed fissionable body 45 that includes generally a cylindrical body member 25 comprising uranium or other fissionable material and is substantially encased within a can or jacket 30 of aluminum.

The jacket 30 is initially open at one end to receive the metal body 25 and has an internal diameter such as to snugly encase the metal body. In order to provide for the efficient thermal conduction of heat outwardly from the metal body 25 to the jacket 30 and thereby insure effective cooling by means of the coolant passing thereover, the jacket 30 is securely bonded to the body by means of a suitable bonding material applied in the form of a coating 44 by dipping the body in a molten bath of the selected bonding material. Any suitable metal alloy having good thermal conduction properties and melting points below that of the jacket 30, such as, for example, aluminum silicon alloy or zinc or alloys of zinc or bismuth may be employed for this purpose.

As previously stated, the present invention is directed particularly to the provision of an efficient heat shield between the jacket 30 and the ends of the self-heating body 25 in a self-sustaining neutronic reactor. To this end, therefore, prior to coating the body 25 with zinc, the ends of the body are machined to provide identical shallow conically beveled ends 31, each one being adapted to seat in a conforming conical recess 42 of a heat shielding member 33.

More specifically, the heat shielding members 33 comprise heat insulators of magnesium oxide or other suitable insulation 34 incorporated in heat conducting blocks 35 made of aluminum or other nonfissionable material. Although magnesium oxide in the form of a compressed circular disc is employed as the heat insulating material, it will be understood by those skilled in the art, that other suitable insulating materials such as, for example, zinc oxide or trivalent bismuth oxide could be used. Likewise a material having good heat conductivity may be substituted for aluminum as long as the substitute material does not stop the chain fission reaction by absorbing an excessive number of neutrons.

Enough aluminum is provided at the ends 31 of the uranium body 25 to conduct heat radially outward to the fluid cooled surface of the jacketed body 45 and to thereby keep the temperature below the point where excessive diffusion of the zinc bonding material 44 into the aluminum takes place. It has been found that for a fissionable uranium body having a length of approximately eight inches and a diameter of approximately one and three-eighths inches, the thickness of the aluminum conductors 35 must be of the order of two millimeters. However, if this thickness of aluminum were continued radially outwardly to the jacket, a high heat concentration would result at the outer edge that would tend to produce alloying with the bond 44 and possible rupture of the contiguous portion of the jacket 30 with consequent harmful leakage of the coolant therethrough. Therefore, the aluminum conductors 35 are flared or thickened at the outer edges 36 in order to distribute the heat over a large cooling surface.

While a minimum aluminum conductor thickness of two millimeters is sufficient to keep the uranium-aluminum interfaces below the temperature of interaction or reaction with water, it is desirable to interpose the insulators 34 between the conductors 35 and the overlying jacket ends 37 and 38 in order to further reduce the temperature of the outside of the jacket ends. Accordingly, the circular discs of compressed magnesium oxide are located in conforming recesses outwardly disposed in the conductors 35 and are secured therein by overlying aluminum discs 40 that are brazed into the conductors 35. Magnesium oxide insulators 34 having a thickness of the order of three millimeters provide sufficient insulation to protect the closed end 37 and the sealed end 38 comprising an aluminum cap welded or otherwise secured over the original opening in the jacket 30 to thereby provide an unbroken fluid tight container about the uranium body 25.

The jacketed body 45 is assembled by placing one of the shielding members 33 in the bottom of the jacket 30 and thereafter the body 25 is heated, dipped in the alloy coating bath of the selected bonding material and while the coating material is in a molten condition slipped endwise into the jacket 30 which is formed initially to have an axial length somewhat greater than that of the encompassed body 25 in order to provide for the inclusion of the shielding members 33. Should the molten bonding material flow around the shielding member located in the closed end or bottom of the jacket 30, the aluminum disc 40 having been brazed to the shield 33 to form a fluid-tight seal about the insulator 34, the bonding material will not penetrate into the insulator recess and reduce the insulating properties of the insulator. Furthermore, should the seal formed by the disc 40 be a faulty one and the bonding material penetrate into the insulator recess in the shielding member 33, the relatively solid construction of the insulating member 34 precludes appreciable penetration of the insulator and consequently there is no appreciable reduction in the insulation properties of the insulator.

Thereafter, the excess bonding material in the jacket 30 outwardly of the body 25 is removed as by pouring or ladling and following the solidification of the bond 44, the other of the shielding members 33 is placed in the upper or open end of the jacket; and the cap 39 is secured by a continuous weld 41 to an opened end 38 of the jacket and to shield 33 thereby providing a fluid-tight aluminum cover about the uranium body 25 and the shielding members 33.

As has been previously indicated the types and amounts of materials that can be utilized for their heat insulation and conduction properties are limited by their absorption affinity for the fission producing neutrons of a self-sustaining chain reacting system. Consequently in some systems the amount of solid insulating material necessary to effectively insulate the end of the jacket may be so large that the neutron absorbing property of that aggregate of insulating material reduces the reproduction ratio of fission neutrons below unity and thus stops the chain reaction.

This difficulty may be surmounted in accordance with the present invention by substituting a free air space, which has excellent heat insulating and negligible neutron absorbing properties, for the solid insulator 34 either at one or both ends depending upon the amount of solid insulation that can be employed without lowering the neutron reproducing ratio below unity. If only one solid insulator need be eliminated, the solid insulator 34 should be placed in the lower heat shielding member 33 so that during assembly of the fissionable body 45 any inleakage of the molten bonding material through the seal formed by the disc 40 into the insulation chamber does not destroy the insulating property of the solid insulator. The free air space insulation may, in that event, be located in the other or upper insulation chamber. Inasmuch as the excess bonding material is removed before the upper shielding member 33 is inserted in the jacket there is no opportunity for molten bonding material to leak into and fill the upper insulation chamber thereby eliminating the free air space and destroying its insulation property. In the event of subsequent melting of the bonding material, the seal formed by the disc 40 prevents inleakage of the bonding material and consequent reduction in the volume and effectiveness of the insulating air space.

Figure 5:
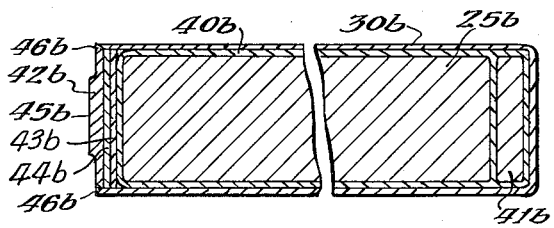
FIG. 5 is a longitudinal sectional view of a modified fissionable body enclosed in a non-fissionable sheath.

A second embodiment of a jacketed fissionable body that is adapted to resist corrosion of the coolant as well as to restrain fission fragments is shown in FIG. 5. This assemblage comprises a uranium body 25b of circular cross-section disposed in a closely fitting aluminum can or jacket 30b. An intermediate layer 40b completely bonds the jacket 30b to the enclosed uranium. An insulating disc of magnesium oxide or similar material 41b is located at the bottom of the uranium body, and is bonded to the bottom of the can and to the uranium by the interlayer 40b. A second insulating disc 43b is bonded to the uranium slug at the upper end thereof. A further disc of aluminum or other heat conducting material of low neutron capture cross-section 42b serves as a closure tightly welded to the end of the can with a second heat conducting disc of aluminum or the like 44b loosely disposed between the discs 42b and 43b. If desired, disc 42b may be provided with a boss or other projection 45b projecting outwardly from the outer surface of the disc. This projection will engage the end of the opposing jacketed body and prevent contact of the two bodies adjacent the welds thereof.

The assemblage may be constructed in the following manner. A uranium rod of proper dimensions is shot blasted and the rod and can are both dipped in molten bronze for 45 seconds at a temperature of 1295–1305° F. and is centrifuged to remove excess coating. Thereafter, the tinned rod is dipped in a molten bath comprising 87 parts by weight of aluminum and 13 parts by weight of silicon at 1095–1105° F. for 6 seconds. The disc 41b which may or may not be coated with aluminum-silicon is inserted in the coated aluminum can, a quantity of the above molten aluminum-silicon composition introduced into the can, and the can is placed in a tightly fitting steel sleeve which has been heated to 1095–1105° F. Thereupon, the tinned uranium rod is forced by hydraulic pressure into the can, excess molten aluminum-silicon forced from the can and the disc 43b previously coated with aluminum silicon is set in place and bonded to the end of the uranium rod. The assemblage is then chilled and the edges of the can machined to fit discs 42b and 44b closely. These discs are then inserted and disc 42b is tightly welded to the can as shown at 46b. The uranium rod is thus hermetically sealed in the jacket. Similar bodies may be produced using other bonding agents in lieu of aluminum silicon. For example, molten zinc or zinc containing one or more percent of aluminum or zinc-tin, zinc-magnesium, zinc antimony or zinc-beryllium alloys may be used to bond the sheath to the uranium or other fissionable body.

As previously described, jacketed bodies of this type which are slightly smaller than the reactor tubes or channels are dispersed therein and a coolant such as water or diphenyl is passed through the channels.

Because of the danger incident to leakage of the coolant through the sealed barrier and into reactive contact with the fissionable body, it is not only necessary to detect faulty jackets before they are utilized in the reactor, but it is also necessary to quickly detect and remove jackets which develop leaks while in use. This may be accomplished by incorporating a telltale material in the jacket which may be readily detected when it or its reaction product escapes from the jacket into the coolant during use or into a testing tank containing water prior to use. Because of the necessity of keeping neutron absorbing impurities at a minimum, it is advantageous to use a material having both telltale and insulating properties. Calcium carbide is an example of such a material. By substituting a calcium carbide insulator disc for the magnesium-oxide disc 43b any leakage of the coolant through the sealing weld 46b into the jacket produces acetylene which escapes into the coolant stream and, thereafter, may be readily detected.

Other compositions which may be used as a means of detecting leaks include various compositions which dissolve, swell, disperse or otherwise react with the water or other coolant which is used in the neutronic reactor. For example, compositions may be incorporated into the jacket which will evolve gas by interaction of the telltale with the coolant or which will produce a color or produce radioactivity in the coolant. Thus, eosin when used, will dissolve and color the coolant or testing liquid in which the defective reacting slug is subjected to exposure. Similarly, palladium chloride or other rare metal chlorides may be incorporated and detected by suitable analytical or spectrographic means. Moreover, radioactive compounds may be incorporated such as radioactive sodium chloride or compounds of radioactive fission products and the leak detected by observation of the presence of radioactivity or increased radioactivity in the testing liquid or coolant.

The various telltales may be used in a particularly effective manner by incorporating them in the ends of the jacketed bodies in lieu of other heat insulating materials. In such a case the telltale materials have a dual function in that they also act as heat insulators preventing the ends of the jacketed bodies from becoming over-heated as previously discussed.

The presence of leaks in such jacketed bodies may be determined either before their insertion into the neutronic reactor or during use in the reactor. For example, the jacketed bodies after completion may be inserted in a pool of water with or without pressure and observed for detection of the expected reaction of the coolant with the telltale. Moreover, after the jacketed bodies have been inserted into the neutronic reactor the coolant may be constantly analyzed or otherwise observed to detect the presence of the expected reaction of the telltale with the coolant and in the event color or presence of radioactivity or other phenomenon occurs in the coolant or in the event bulging of the jacketed bodies occurs in an endwise direction (as would be the case when the telltale is a material which swells upon reaction with water). The operator of the reactor will be warned that a defective jacketed body is present and the situation may be corrected by removal of the defective body before damage can occur to the reactor itself.

Figure 6:
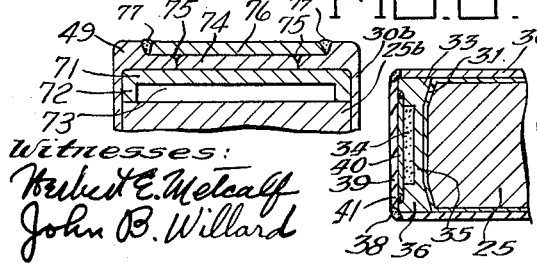
FIG. 6 is a cross-sectional view of a modified double closure seal for jacketed fissionable bodies.

FIG. 6 illustrates a modified can closure structure wherein there is a non-fissionable aluminum jacket 30b having a thick lip 49 initially extending outwardly beyond the squared end of the uranium body 25b. A heat insulating and conducting member in the form of an aluminum cup 71, having a squared lip 72 abutting the body 25b, is snugly fitted into the jacket and provides a heat conducting member spaced from the uranium body 25b by a heat insulating gas space 73. The lip 49 of the jacket 30b is turned inwardly into tight heat conducting contact with the conductor 71 and sealed by an inner cap 74 and weld 75. Outwardly of the cap 74 the jacket is milled or otherwise recessed to receive an outer cap 76 that overlies the inner cap 74 and weld 75. The outer cap 76 is secured to the jacket 30b by a second weld 77 thereby providing a double sealed closure for the jacketed body 25b.

Figure 8:
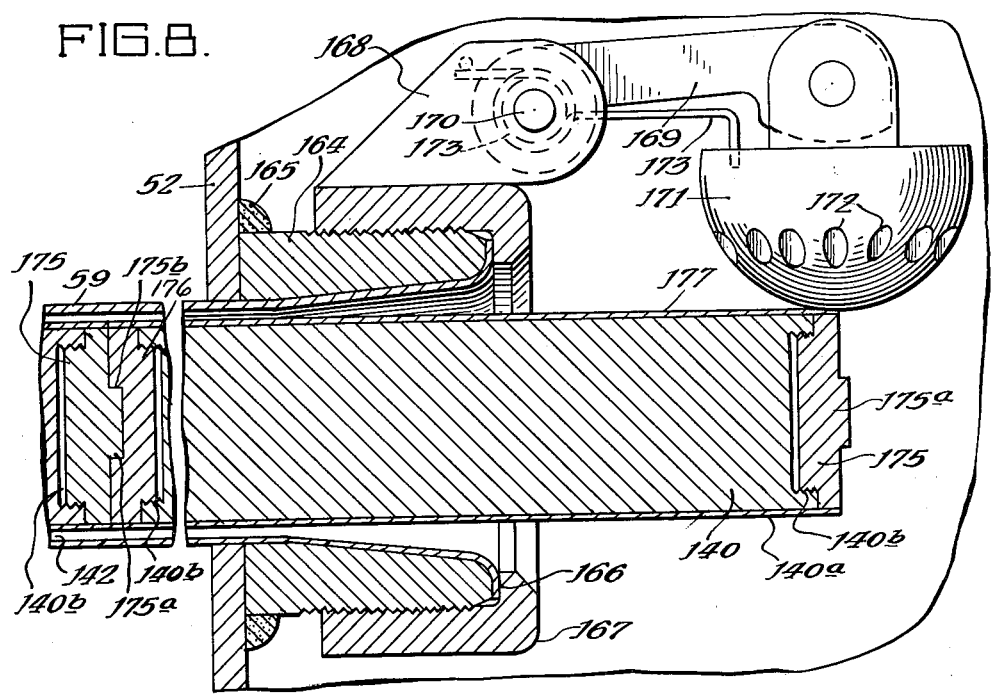
FIG. 8 is a view corresponding to FIG. 7 but showing the fissionable rod projecting from the end of the tube with the rod retainer held in the open position by the rod.
Figure 7:
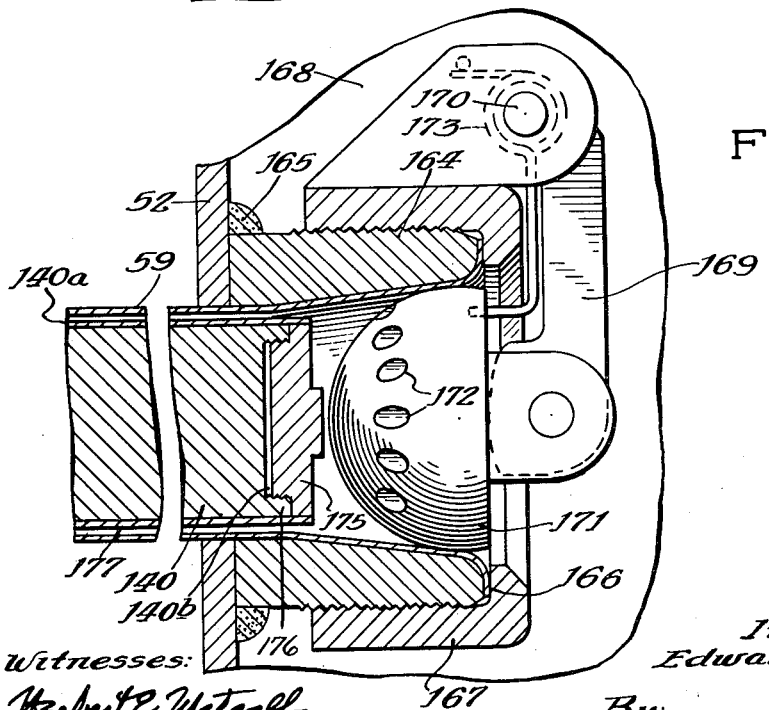
FIG. 7 is an enlarged fragmentary vertical sectional view through the discharge end of one of the tubes of the reactor shown in FIG. 1 and shows in elevation the rod retainer in closed position.

Because of the rapid flow of coolant through the channels some means is usually provided for restraining movement of the fissionable bodies through the channels. FIGS. 7 and 8 diagrammatically illustrate such a means in use with a modified jacketed fissionable body.

As shown therein, a discharge end of each tube 59 passes through casing 52, and then terminates. Sleeves 164 are welded or otherwise secured as at 165 to the casing 52. Each tube 59 passes through a sleeve 164. The sleeve 164 is threaded on its peripheral face to receive a cap 167. It is important that water (not shown) is not permitted to pass between the tube 59 and the sleeve 164 and for this reason each tube 59 is flanged at its end at 166 over the outer edge of the sleeve 164, and cap 167 applies a pressure seal against this flange 166 of tube 59.

The cap 167 is provided with a bifurcated bracket 168 adapted to receive an arm 169 pivotally mounted at 170 on this bifurcated bracket 168. A retainer plug 171 is mounted on the free end of the arm 169 and this plug is substantially hemishperical in shape and adapted to fit into the flared end of the tube 59 as best shown in FIG. 7. The retainer plug 171 is provided with a plurality of perforations 172 to permit the passage of cooling fluid from the tube 59 through plug 171. A torsion spring 173 normally holds retainer plug 171 in its closed position shown in FIG. 7 so that force is required to open the plug to the position shown in FIG. 8 and to retain it in its open position.

In this jacketed embodiment each uranium rod 140 comprises a plurality of rod segments 140a interlocked together to form in effect the continuous rod 140. On each end of each segment 140a is threaded as at 176 a thick aluminum end cap 175. Space 140b is provided between each end cap 175 and the uranium body to serve as an insulating dead air space.

While fissionable bodies provided with a sheath that is bonded thereto are particularly effective, bonding frequently is found to be unnecessary. In such instances the fissionable body may be directly enclosed in a jacket without an intermediate bonding layer. As is illustrated in FIGS. 7 and 8, an aluminum sheath 177 closely fits around the sides of each rod segment 140a and is welded to the end cap 175, thus completely sealing the uranium rod segment 140a within aluminum without an intermediate bonding layer. The rod segments 140a are arranged end to end in each tube 59 and the end caps 175 of adjacent ends of adjoining rod segments 140a are provided respectively with male and female portions 175a and 175b coperating to form an effective interfit between adjacent rod segments. The segments 140a are thereby maintained in proper alignment.

The cooling medium, for purposes of illustration may be water, enters the tubes 59 at the opposite end thereof, then passes lengthwise through the tubes in the annular space 142 between the walls of tubes 78 and the rods 140. Thus, the water passes over the surface of the aluminum sheath 177 surrounding the uranium in each tube and thereby extracts heat that is conducted to the surface of the aluminum sheath 177 from the uranium rod 140. The water thus passing through each tube 59 flows through the openings 172 in the normally closed rod retainer 171 into the water filled tank 68.

The dead air insulating space 140b tends to prevent transfer of heat from the hot axial portion of the uranium rod to the axial portion of the aluminum cap and thereby avoids corrosion difficulties arising from contact of coolant with an overheated end cap. Other insulating end caps or sections may be used to effect the same result.

Sheathed bodies of the type described are also well suited for use in the air cooled neutronic reactor described in the application of Gale Young mentioned herein. Their effectiveness is not confined to use with any specific type of neutronic reactor but may be used generally in all such reactors. For example, a neutronic reactor moderated with deuterium oxide may be constructed using a tank of aluminum 6 feet in diameter and 7 feet 4 inches high. In one such reactor 136 rods of uranium metal 1.1 inches in diameter and having an aluminum jacket 0.035 inch thick were mounted vertically in the tank to extend to within ¼ inch from the bottom of the tank. The reactor was surrounded with a 12 inch reflector of graphite. When 122.4 inches of $D_2O$ containing less than 1 percent $H_2O$ was placed in the tank the reactor reached critical size. When 124.7 inches of $D_2O$ was introduced the time for doubling of the neutron density therein was about 6.5 seconds.

In such a reactor coolant is not necessary since the liquid moderator ($D_2O$) may be withdrawn, cooled and returned to maintain the temperature of the reaction constant. By using jackets protected at their vulnerable ends against the heat from the fissionable bodies, the tendency for the jacket to fail is substantially reduced.

Numerous fissionable compositions may be used in accordance with the present invention. In addition to natural uranium metal, uranium compounds such as uranium oxide, or uranium carbide may be used. Moreover uranium containing more than natural concentrations of $U^{235}$ are suitable for neutronic reactors. Other suitable compositions include $U^{233}$, $U^{235}$, or $94^{239}$ taken alone or in combination with $U^{238}$ or $Th^{232}$, the isotopes being either in combined or elemental form.

Many other variations of and applications for the present invention will be apparent to those skilled in the art and the invention is, therefore, to be limited only by the scope of the appended claims.

What is claimed is:

1. An article of manufacture which comprises a body comprising thermal neutron fissionable material, a barrier of material non-fissionable by thermal neutrons covering the sides of the body, an end cap of material non-fissionable by thermal neutrons covering an end of the body, and a quantity of magnesium oxide disposed between only the end cap and the body, said article being suitable as an active component of a neutronic reactor.

2. An article of manufacture which comprises a body comprising uranium, a barrier of aluminum covering the sides of the body, an outer end cap of aluminum covering an end of the body and sealed to said barrier, an aluminum member disposed between the end cap and the body, said aluminum member having a greater thickness at its periphery than at its center, a magnesium oxide member between said aluminum member and said end cap, and an inner end cap sealed to said aluminum member, said article being suitable as an active component of a neutronic reactor.

3. A fuel element for nuclear reactors which comprises an elongated core of fissionable material having a conically beveled end, a jacket of aluminum around said core and a conically indented shielding assembly snugly fitting over said conically beveled end, said assembly having about the same diameter as the core of said fuel element and said core and assembly being encased by the jacket; said assembly comprising a block of aluminum, said block contacting the core and having a greater thickness at the periphery than at its central section, thereby forming a recess in its central section, a heat-insulating material selected from the group consisting of magnesium oxide, zinc oxide and bismuth oxide in said recess, and a supporting member of aluminum above said heat-insulating material, said supporting member being brazed to the heat-conducting block.

4. The fuel element of claim 3 wherein the heat-insulating material is magnesium oxide.

5. The fuel element of claim 3 wherein the heat-insulating material is zinc oxide.

6. The fuel element of claim 3 wherein the heat-insulating material is bismuth oxide, $Bi_2O_3$.

References Cited in the file of this patent

UNITED STATES PATENTS

| | | |
|---|---|---|
| 46,987 | Barron | Mar. 28, 1865 |
| 1,720,327 | Halvorson | July 9, 1929 |
| 2,206,634 | Fermi et al. | July 2, 1940 |
| 2,284,551 | Alexander | May 26, 1942 |
| 2,287,619 | Kallman et al. | June 23, 1942 |
| 2,848,800 | Maloney et al. | Aug. 26, 1958 |
| 2,849,387 | Brugmann | Aug. 26, 1958 |
| 2,849,388 | Brugmann | Aug. 26, 1958 |
| 2,849,389 | Brugmann | Aug. 26, 1958 |
| 2,886,503 | Szilard et al. | May 12, 1959 |
| 2,890,158 | Ohlinger et al. | June 9, 1959 |

FOREIGN PATENTS

| | | |
|---|---|---|
| 440,023 | Great Britain | Dec. 12, 1935 |
| 114,150 | Australia | May 2, 1940 |
| 861,390 | France | Oct. 28, 1940 |
| 233,011 | Switzerland | Oct. 2, 1944 |

OTHER REFERENCES

Friend: Textbook of Inorganic Chemistry, vol. VII, part III, page 282 (1926), published by Charles Griffin and Co. Ltd., London.

Smith: "Atomic Energy for Military Purposes," pages 103, 104, August 1945.

Kelly et al.: Physical Review 73, 1135–9 (1948).